(12) United States Patent
Marks et al.

(10) Patent No.: US 7,904,394 B2
(45) Date of Patent: Mar. 8, 2011

(54) DOCUMENTING MAIL WORK FLOW

(75) Inventors: Peter Marks, San Anselmo, CA (US); River C. Lune, Berkeley, CA (US)

(73) Assignee: Lynch Marks, LLC, Albany, CA (US)

( * ) Notice: Subject to any disclaimer, the term of this patent is extended or adjusted under 35 U.S.C. 154(b) by 45 days.

(21) Appl. No.: 12/009,014

(22) Filed: Jan. 15, 2008

(65) Prior Publication Data
US 2008/0288422 A1   Nov. 20, 2008

Related U.S. Application Data

(60) Provisional application No. 60/928,516, filed on May 16, 2007.

(51) Int. Cl.
*G06F 17/00* (2006.01)
*G06Q 30/00* (2006.01)

(52) U.S. Cl. .......................................... 705/404; 705/335

(58) Field of Classification Search ................ 705/4 X, 705/1; 235/375; 382/306
See application file for complete search history.

(56) References Cited

U.S. PATENT DOCUMENTS

| 739,201 | A | * | 9/1903 | Morton | 434/404 |
|---|---|---|---|---|---|
| 4,319,328 | A | * | 3/1982 | Eggert | 705/404 |
| 4,832,204 | A | * | 5/1989 | Handy et al. | 209/3.3 |
| 5,477,462 | A | * | 12/1995 | McClung | 705/408 |
| 5,717,596 | A | * | 2/1998 | Bernard et al. | 705/404 |
| 5,787,400 | A | | 7/1998 | Weber | |
| 6,119,051 | A | * | 9/2000 | Anderson et al. | 700/221 |
| 6,298,337 | B1 | * | 10/2001 | Kubatzki et al. | 705/410 |
| 6,427,032 | B1 | * | 7/2002 | Irons et al. | 382/306 |
| 7,082,417 | B1 | * | 7/2006 | Marry et al. | 705/402 |
| 7,149,726 | B1 | * | 12/2006 | Lingle et al. | 705/411 |
| 7,209,897 | B2 | * | 4/2007 | Ghiloni et al. | 705/40 |
| 2002/0023057 | A1 | | 2/2002 | Goodwin et al. | |
| 2002/0032573 | A1 | | 3/2002 | Williams et al. | |
| 2003/0083890 | A1 | | 5/2003 | Duncan et al. | |
| 2003/0115612 | A1 | * | 6/2003 | Mao et al. | 725/136 |
| 2004/0188522 | A1 | * | 9/2004 | Ashaari | 235/385 |
| 2004/0230543 | A1 | * | 11/2004 | Baker et al. | 705/401 |

(Continued)

FOREIGN PATENT DOCUMENTS

GB    2428315 A    1/2007

OTHER PUBLICATIONS

"PS Ship Label Server," Published by Lynch Marks LLC as noted by web.archive.org on Feb. 13, 2006 of website http://web.archive.org/web/20060213043422/psship.com/pdf/psship_ups.pdf.*

(Continued)

*Primary Examiner* — John W Hayes
*Assistant Examiner* — Brian Epstein
(74) *Attorney, Agent, or Firm* — Carr & Ferrell LLP (57) ABSTRACT

Exemplary systems and methods for documenting mail work flows are provided. A mailing label is read and the label information stored in a database. Additional information about the mailing service may be added to the database. Billing and/or delivery information is added to the database. A mailing label is read at a postage machine and postage information including a rate is associated to the mailing label. The label information from the mailing label and the associated postage information are compared so that records having matching information can be reported together for billing of the mailing services. The records are updatable as well to provide for article tracking.

16 Claims, 7 Drawing Sheets

U.S. PATENT DOCUMENTS

| | | |
|---|---|---|
| 2004/0243501 A1 | 12/2004 | Duffey |
| 2004/0243522 A1* | 12/2004 | Foth et al. ............... 705/404 |
| 2004/0263901 A1* | 12/2004 | Critelli et al. ............ 358/1.15 |
| 2005/0171791 A1 | 8/2005 | Chimenti et al. |
| 2005/0171919 A1* | 8/2005 | Baker et al. ............... 705/404 |
| 2005/0237203 A1 | 10/2005 | Burman et al. |
| 2005/0237204 A1 | 10/2005 | Burman et al. |
| 2005/0278263 A1* | 12/2005 | Hollander et al. ......... 705/402 |
| 2006/0020505 A1 | 1/2006 | Whitehouse |
| 2006/0080266 A1* | 4/2006 | Kiani et al. ............... 705/402 |
| 2006/0089869 A1 | 4/2006 | Mundy |
| 2006/0173797 A1* | 8/2006 | Sheehan et al. ........... 705/404 |
| 2006/0173798 A1* | 8/2006 | Charroppin ............... 705/404 |
| 2006/0229895 A1 | 10/2006 | Kodger, Jr. |
| 2006/0282271 A1 | 12/2006 | Ananda et al. |
| 2006/0282277 A1 | 12/2006 | Ng |
| 2007/0000990 A1 | 1/2007 | Baldassari et al. |
| 2007/0022059 A1* | 1/2007 | Heiden ...................... 705/401 |
| 2007/0043651 A1 | 2/2007 | Xiao et al. |
| 2007/0073551 A1 | 3/2007 | Williams et al. |
| 2007/0124084 A1 | 5/2007 | Torre-Bueno |
| 2007/0260561 A1* | 11/2007 | Martin et al. ............. 705/403 |
| 2008/0126218 A1 | 5/2008 | Alvarado et al. |
| 2008/0210749 A1* | 9/2008 | Skaaksrud et al. ......... 235/375 |
| 2008/0255863 A1 | 10/2008 | Mack et al. |
| 2008/0283586 A1 | 11/2008 | Marks et al. |
| 2008/0288368 A1 | 11/2008 | Marks et al. |
| 2008/0288463 A1 | 11/2008 | Marks et al. |
| 2009/0057403 A1 | 3/2009 | Marks et al. |
| 2009/0094082 A1 | 4/2009 | Willoughby |

OTHER PUBLICATIONS

Pitney Bowes Inc., U.S. Patent App. #20050171919, Filing Date: Feb. 3, 2004.

Roadway Package System, Inc., U.S. Paten #4832204, Filing Date: Jul. 11, 1986.

Online Publication, www.eshipper.com/aboutus.aspx, Publication Date: Nov. 18, 2006.

Online article, www.pr.com, "Shipping Sidekick . . . ", Publication Date: Aug. 31, 2007.

* cited by examiner

Prior Art

DOCUMENTING MAIL WORK FLOW

CROSS-REFERENCE TO RELATED APPLICATIONS

The present application claims the priority benefit of U.S. provisional patent application No. 60/928,516, filed May 16, 2007 and entitled "Methods and Systems for Shipping Management." The present application is related to nonprovisional application titled "Integrated Databases for Tracking Shipping Information" and "Real-Time Pricing of Shipping Vendors," filed concurrently herewith. The disclosures of the aforementioned applications are incorporated herein by reference.

BACKGROUND OF THE INVENTION

1. Field of the Invention

The present invention generally relates to mailing processes. More specifically, the present application relates to documenting mail work flow.

2. Description of the Background

There are presently various methods for sending an article to a recipient, including shipping using various shipping vendors such as FedEx®, United Parcel Service (UPS®), and DHL®, various local couriers, and creating a mail request for mail sent through a postal service (e.g., United States Postal Service(USPS). In some circumstances, it may be desirable to send the article by mail. For example, where a sender desires proof of delivery, the sender may wish to send an article by Certified Mail™, whereby the sender receives a receipt stamped with the date of mailing.

Mail, as used in the present patent application, refers to the system whereby articles are delivered to a recipient by a postal service. In the United States, mail is sent via the United States Postal Service. An article of mail may be an envelope, box, package, or other mailing container. To send an article by mail, a sender must pay a postage fee. Proof of payment may appear as a postage stamp, which may be adhered, inked, or otherwise affixed to the article. Postage fees for sending an article through the mail may vary based on sender information, recipient information, various characteristics of the article (e.g., size, shape, weight, contents, value), and various add-on mailing services, such as return receipt, insurance, etc. Postage, therefore, is usually determined after the article is packaged, weighed, sized, addressed, etc.

Some users or enterprises may use pre-paid postage meters, which calculates and generates postage stamps. Postage meters can maintain a record concerning how much postage has been used. For example, a postage meter may subtract the rate of each generated postage stamp from the pre-paid amount and keep a running total. Some users or enterprises, however, may desire more detailed information, such as allocation by department, to a particular account, sender information, recipient information, etc. Where a user or enterprise sends many articles through the mail, it may become difficult to maintain accurate and detailed records concerning each mailed article.

Presently, maintaining such detailed records may require that for each article, an individual manually record (e.g., type an entry in a database) various details, such as sender name, sender address, department, account number, recipient name, recipient address, etc. Further, after postage fees are determined, such information may be recorded and associated with the other details concerning the particular article of mail. As an example, a user wishing to send an article by Certified Mail™ must fill out the Certified Mail™-specific mailing label form with information such as sender address, recipient name and address, etc. Postage must also be determined, paid, and a postage stamp affixed to the article before it can be sent. The only documentation may include the Certified Mail™ receipt, a copy or photocopy of the certified shipping label, and perhaps a postage machine record concerning the postage, size, weight of the article, etc. The various pieces of information concerning the one mailed article are kept separately, in hard copies, and/or scattered among information concerning various other articles of mail.

Figure 1:
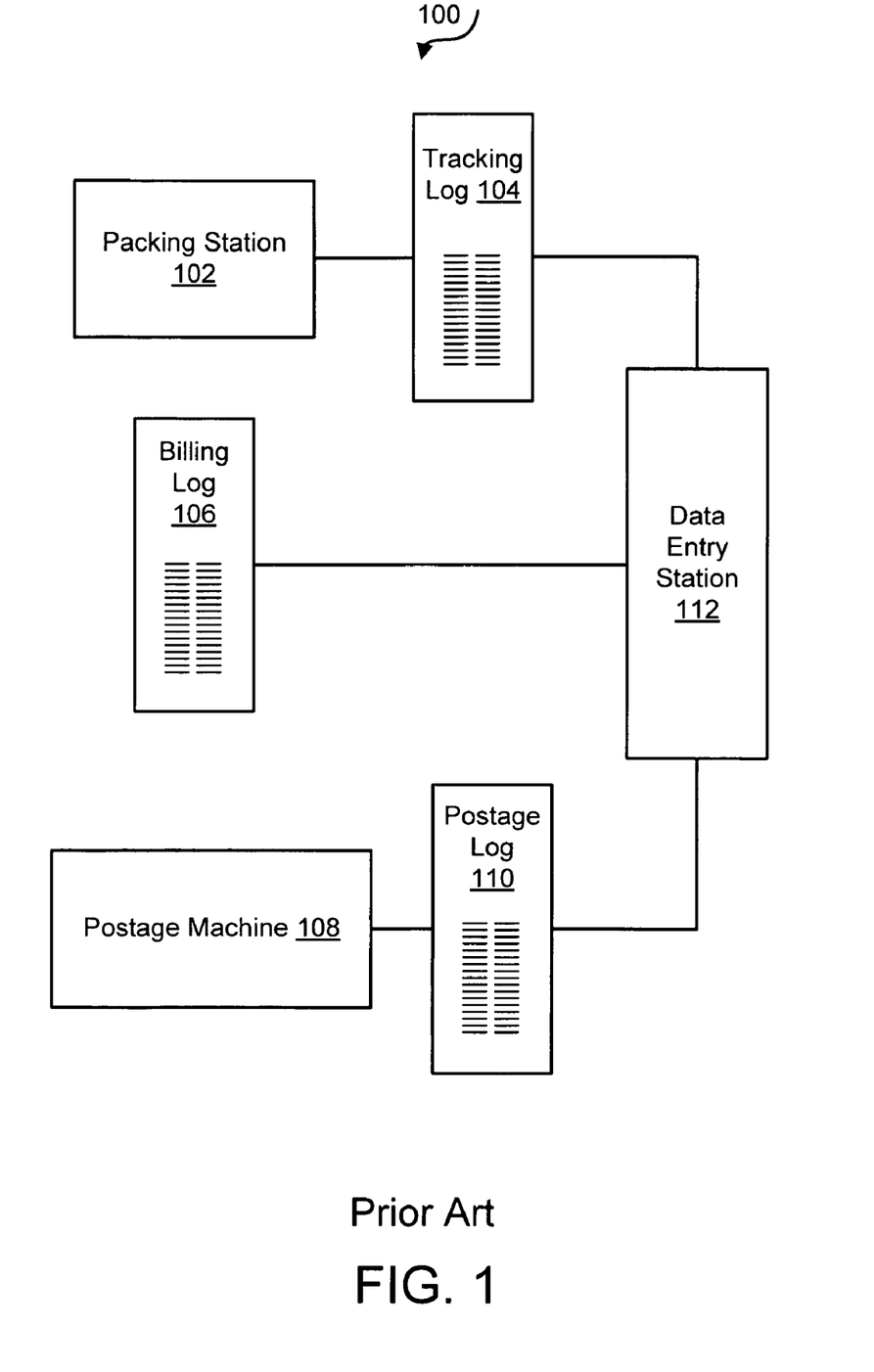
FIG. 1 is an illustration of a typical prior art system for documenting mail work flows.

FIG. 1 is an illustration of a typical prior art system for documenting mail work flows. As illustrated, such presently available systems may include a package table 102, a tracking log 104, a billing log 106, a postage machine 108, a postage log 110, and a data entry station 112.

The package station 102 is an area for preparing an article for mailing. The package station 102 may be a mail room, a workstation, desktop, or a combination of the foregoing. At the package station 102, the article may be packaged and labeled as necessary. An article being sent using certain mailing services may need to present certain mailing information in a specific mailing label form. Such mailing labels may be created manually or printed from a computerized printing device. Some computerized systems allow a user to save the mailing label electronically (e.g., as a document).

The tracking log 104 is any register for recording information concerning the mailing service, including label information from the mailing label. For example, for each article sent by mail, tracking log 104 may record label information such as the sender's name, the sender's address, department, the recipient's name, the recipient's address, account information, type of mailing services, tracking numbers, etc. The tracking log 104 may be a handwritten register, or an electronic record, such as a spreadsheet, and the like.

Tracking log 104 may be combined or maintained in conjunction with a billing log 106. The billing log 106 is any register for recording various expenditures associated with mailing an article. For example, for each article sent by mail, billing log 106 may record information concerning packaging materials, various mailing service add-ons (e.g., Certified™ mail, insurance). The billing log 106 may include a handwritten register, or an electronic record, such as a spreadsheet.

The postage machine 108 is any device for determining and issuing postage stamps for an article to be mailed. The postage machine 108 may include equipment to determine an article weight, to calculate postage, and to issue postage stamps (e.g., adhesive stamps, ink stamps). At the postage machine 108, the postage fees related to mailing the article may be recorded in the postage log 110.

The postage log 110 is a record of the postage information for mailing an article. Postage information includes the postage fee charged for mailing the article and/or information concerning characteristics of the article used in determining the postage fee. The postage log 110 may include a handwritten register, or an electronic record, such as a spreadsheet. In some embodiments, the postage log 110 may be kept as an electronic record by postage machine 108.

The data entry station 112 is a device where the mailing information from the tracking log 104, the billing information from billing log 106, and the postage information from the postage log 110 may be entered and then reconciled for cost allocation, cost recovery, and various accounting processes, for instance. The various types of information from multiple sources complicate record-keeping and information analysis. Managing information in such a manner may be inefficient, time-consuming, and prone to error.

There is, therefore, a need in the art for improved systems and methods for documenting mail work flows.

SUMMARY OF THE INVENTION

Exemplary methods and systems of the present invention provide for documenting mail work flows. A mailing label for mailing an article is generated based on label information designated by a user. The label information, which includes an assigned tracking number, is stored in a database. Postage information, including a postage rate for mailing the article, is received from a postage machine. The postage information is associated with the tracking number. A report may be generated based on the stored label information and the associated postage information, as indicated by the common tracking number. In some embodiments of the present invention, the tracking number may be further associated with various billing information, such packaging costs, account information, various mailing services, etc.

Methods for documenting mail work flows include receiving label information including a tracking number assigned to a mailing label of an article for mal, storing the label information in a database, receiving postage information including a postage rate for mailing the article via a postal service or using postage from a postage machine, associating the postage information with the tracking number, and generating a report based on the stored label information and the associated postage information. In some embodiments, the method further includes generating the mailing label, storing the postage information in the database, the postage machine scanning the tracking number, and associating the label information and the associated postage information based on tracking number.

Systems for documenting mail work flows include an input for receiving postage information from a postage machine or other stamp provider, a database, and report generator for generating reports based on label and postage information. In some embodiments, systems may further include label generators for generating mailing labels and a postage machine for generating the postage. The information designated by a user concerning the generated mailing labels may be stored in the database. The database may also store the postage information in some embodiments and associate the postage information with the label information based on tracking number.

Embodiments of the present invention further include computer-readable media for documenting mail work flows. In some embodiments, the computer-readable media may further include instructions for receiving tracking numbers from postage machines or other postage providers and associating the postage information with label information based on a common tracking number.

DETAILED DESCRIPTION

Exemplary methods and systems of the present invention provide for documenting mail work flows. A mailing label for mailing an article is generated based on label information designated by a user. The user may enter the label information, designate information from a contacts manager, or a combination. The label information, which includes a tracking number, is stored in a database. Postage information, including a postage rate for mailing the article, is received from a postage machine. The postage information is associated with the tracking number. A report may be generated based on the stored label information and the associated postage information, as indicated by the common tracking number.

Figure 2:
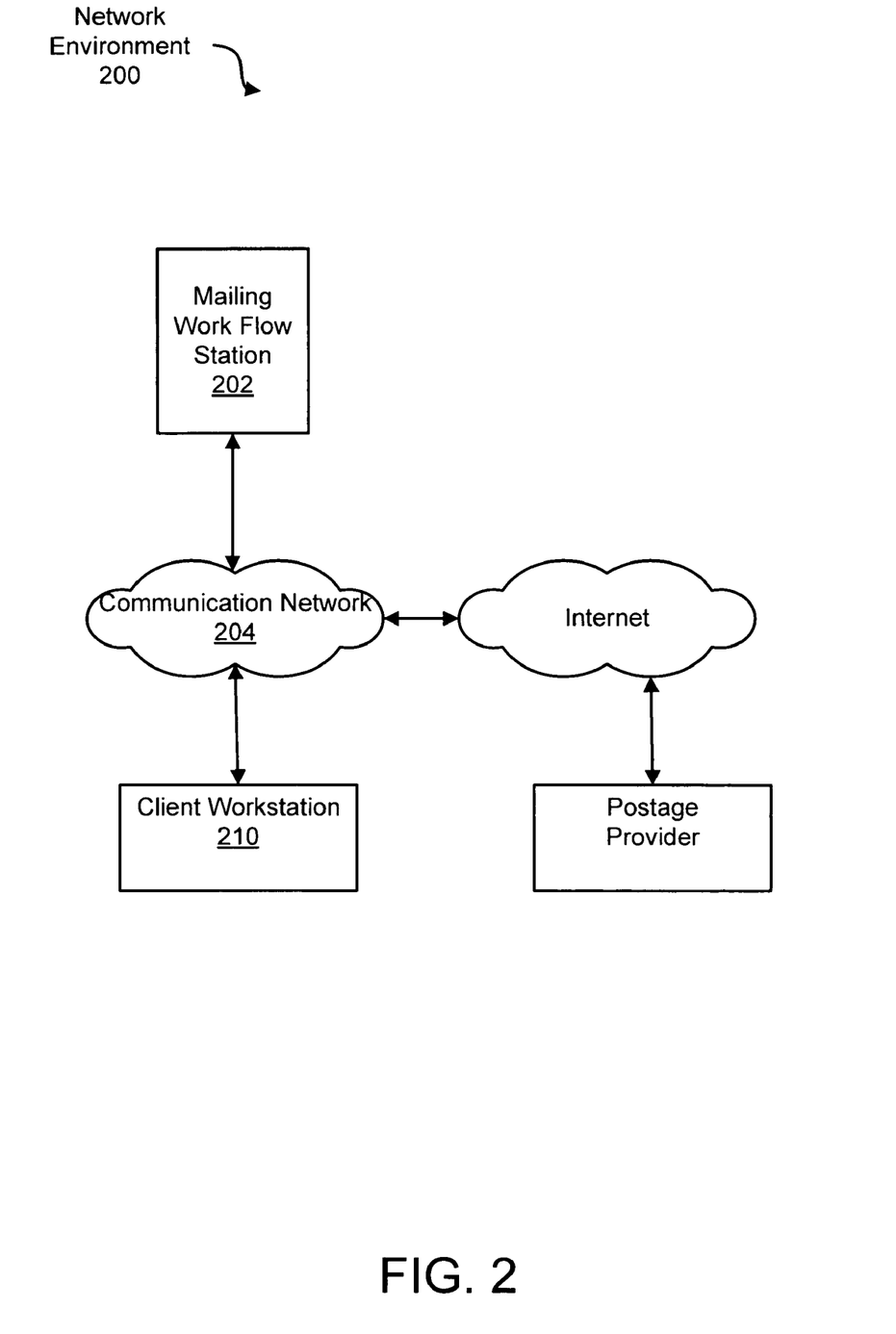
FIG. 2 illustrates an exemplary network environment in which systems for documenting mail work flows may be implemented, according to an embodiment of the present invention.

FIG. 2 illustrates an exemplary network environment 200 in which systems for documenting mail work flows may be implemented, according to embodiments of the present invention. The network environment 200, as illustrated, comprises a mailing work flow station 202 in communication via a communication network 204 to a client workstation 210.

Described in further detail below, mailing work flow station 202 allows for documenting mail work flows, including receiving and storing label information, receiving postage information, associating the stored label information with postage information for the article, and generating a report based on the stored label information and the associated postage information. The mailing work flow station 202 may be an application installed on various computing devices, servers, laptops, etc. The mailing work flow station 202 is configured to transmit and receive data over the communication network 204 from client workstation 210. In some embodiments, mailing work flow station 202 is configured to communicate with a postage provider, the Internet, an application service provider, and to receive manual input from an external postage machine.

Communication network 204 may be a local, proprietary network (e.g., intranet) and/or may be a part of a larger wide-area network, a hosted network, and/or include an application service provider (ASP). For example, communication network 204 may be a local area network (LAN) in an office communicatively coupled to a wide-area network, such as the Internet. Alternatively, communication network 204 for a large organization may span multiple offices in multiple buildings in multiple locations.

Client workstation 206 may be any device that allows for users to communicate with the various stations in network environment 200. For example, using client workstation 208, a user may designate label information for label generation, request reports, and view reports concerning the mailing work flow. In various embodiments, client workstation 206 may include various computing devices, servers, laptops, etc.

In some embodiments, the network environment 200 includes one or more client workstations 208. Each client workstation 208 may include a contacts manager configured to store information regarding various contacts, including addresses, telephone numbers, e-mail addresses, and the like. Contacts manager 140A may further correlate contact information with various mailing specifications (e.g., a particular address, such as a contact's office, may be associated with a particular mailing option, including Certified™ mail). Examples of contacts managers may include Microsoft Outlook®, Lotus Notes®, etc.

Figure 3:
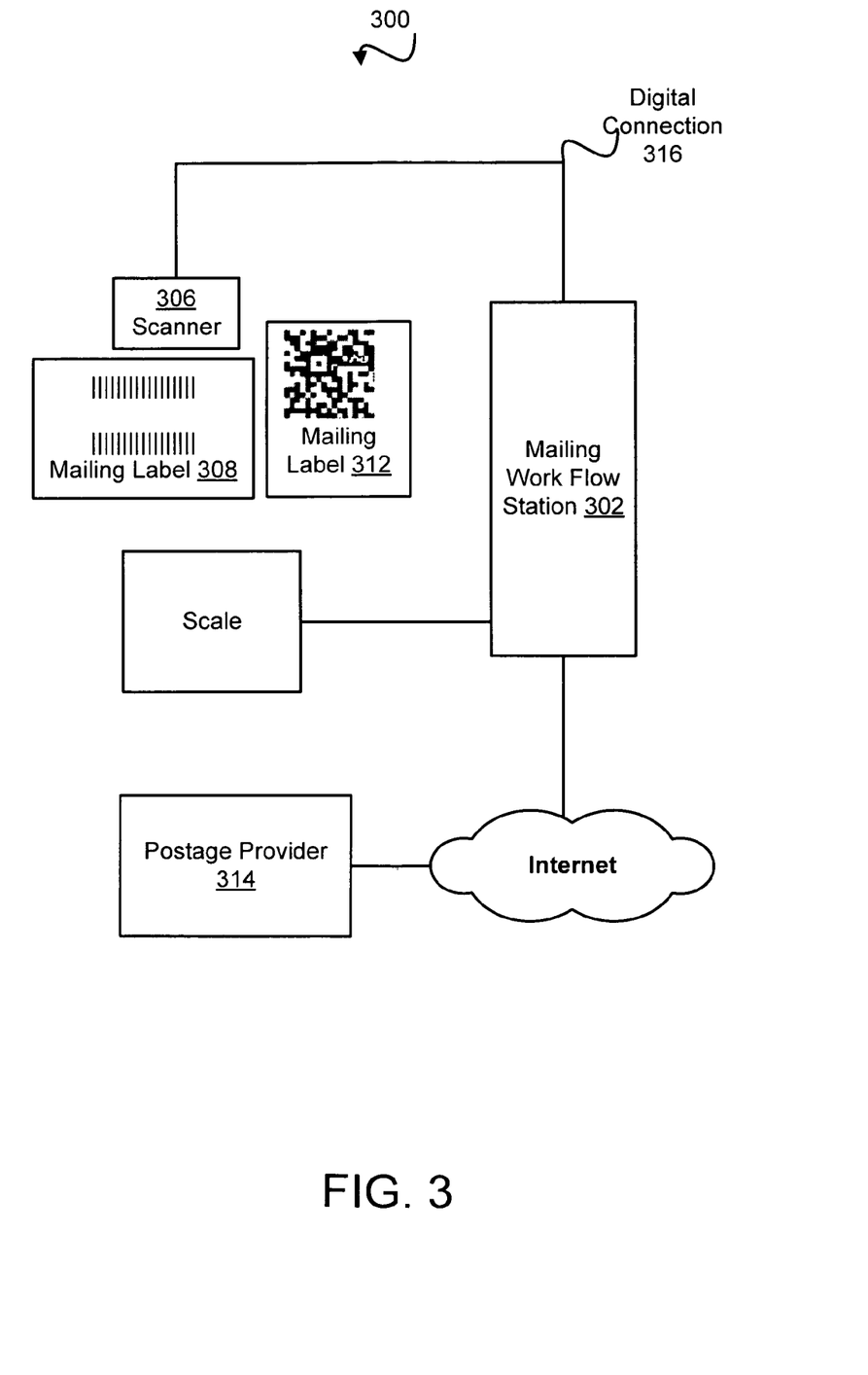
FIG. 3 illustrates an exemplary system for documenting mail work flows.

FIG. 3 illustrates an exemplary system 300 for documenting mail work flows. The exemplary system includes a mailing work flow station 302, interconnected via a digital connection 318 to a scanner 306 for scanning mailing labels, such as mailing labels 308 and 312. The mailing work flow station may also be connected to a scale and, through the Internet, a postage provider 314.

Mailing an article may include preparing a mailing label. Various types of label information may be gathered during label generation, including user information, recipient information, tracking numbers, various mailing services, etc. Certain mailing label forms (e.g., Certified™ mailing labels such as that provided by the USPS) may include a tracking number already provided. In some embodiments, one or more internal tracking number may also be included in the mailing label. The internal tracking number may include various alphanumeric strings, various types of bar codes, etc. In some embodiments, bar codes may be formatted so as to provide information to a postage machine, which can use the information to generate postage. The scanner 306 is a digital device for scanning mailing labels, reading the label information, and passing the label information to mailing work flow station 302.

Mailing labels may also be generated by a label generator based on various user designations. A user may also designate information from various sources, such as a contacts manager. Custom tracking numbers, including custom bar codes, may also be assigned and printed directly onto the mailing label. The custom tracking numbers, including custom bar codes, may further be printed on mailing labels with a tracking number already provided (e.g., Certified™ mailing labels). Mailing label 308, for example, includes two bar codes. In some embodiments, the bar code may be two-dimensional bar code, such as that illustrated in mailing label 312. In some embodiments, the tracking number, including the bar code, may be associated with or indicate various types of mailing information, such as sender information, recipient information, department information, account information, etc. Tracking numbers may further be associated with more detailed information concerning the article of mail, the sender, recipient, account information, etc. A tracking number, therefore, can allow a user to retrieve a complete record of information concerning an article of mail. In some embodiments, the label information may be automatically sent to the mailing work flow station 302.

Following generation of a mailing label for the article to be mailed, postage rates for mailing the article may be determined by a postage provider 314, such as a postage machine or an Internet-based postage provider, based on recipient address, article size, weight, shape, etc. The postage provider may further issue postage stamps for the determined postage rate. The postage provider may then transmit postage information and associated tracking number to the mailing work flow station 302 such information may be used to generate various reports. In some embodiments of the invention, postage provider 314 may also include a scanner for scanning the tracking number (including bar codes) on a mailing label.

In some embodiments of the present invention, postage information for a particular article of mail may be associated with the label information for that article based on the tracking number(s) in common. The mailing work flow station 302 may also generate a report detailing stored label information and the associated postage information. The report may be an electronic display, an electronic file (e.g., PDF, spreadsheet) or a hardcopy (paper form). Because such a report includes details about each article of mail, the report may be used for tracking postage expenditures in detail and determining allocation of postage costs to various offices, departments, accounts, etc. Further, if the articles of mail were sent on behalf of a user's client, for example, the report provides information allowing for cost recovery from the client. Reports may be used as input for various accounting processes and may further be based on various report specifications provided by a user, a system administrator, etc. For example, a user may wish for a report concerning a particular account, a particular department, particular dates, etc. Some reports may be generated regularly, such as monthly accounting reports.

Figure 4:
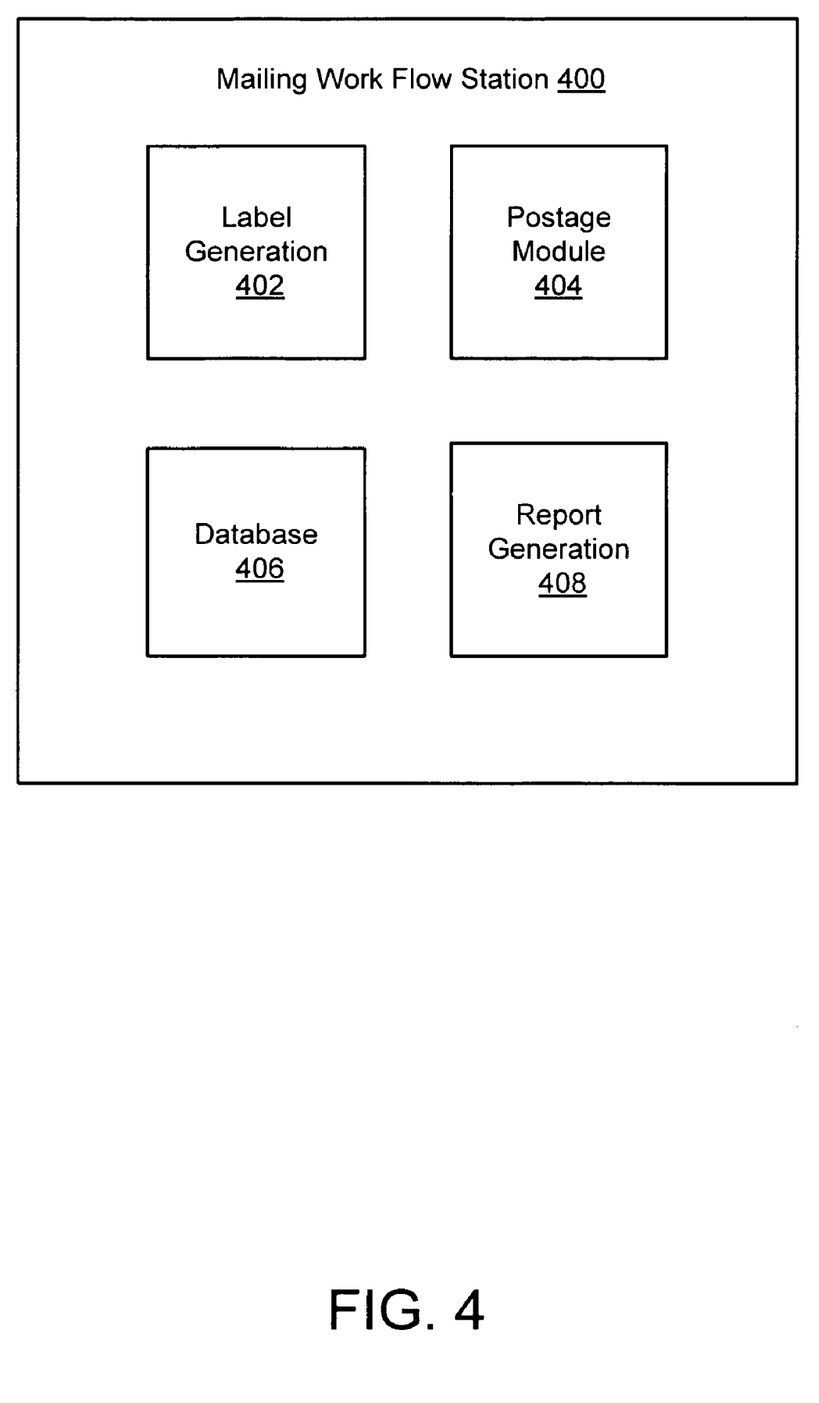
FIG. 4 is a block diagram of an exemplary mailing work flow station.

FIG. 4 is a block diagram of an exemplary mailing work flow station 400. In some embodiments, a mailing work flow station 400 may include a label generation module 402, a postage module 404, a database 406 and a report generation module 408. In some embodiments, the mailing work flow station 400 may further include a scale. A module may be any collection of routines that perform various system-level functions and may be dynamically loaded and unloaded by hardware and device drivers as required. The modular software components described herein may also be incorporated as part of a larger software platform or integrated as part of an application specific component.

Label generation module 402 generates mailing labels based on label information designated by a user. In some embodiments, label generation module 402 may be installed on a client workstation (e.g., client workstation 206). Information in the labels may be provided by a user or a user designating a source for label information, such as a contacts manager. For example, a user may enter a recipient address, or the user may designate a particular contact in a contacts manager as the recipient of a mailed article. Label generation module 402 may then generate shipping labels for the designated contact. Various types of label information may be gathered during label generation, including user information, recipient information, tracking numbers, billing information, cost recovery information, etc. Such label information may be provided to and stored in database 406, described in further detail below.

Mailing work flow station 400 may further include postage module 404. In some embodiments, postage module 404 is configured to receive postage information from a postage machine and to provide the postage information to database 406. The postage information received by the postage module 404 may include a postage rate, size, shape, and weight of the article presented for mailing, a tracking number, etc. In some embodiments, postage module 404 may be further configured to receive postage information manually entered by a user, information from an Internet-based postage provider, information sent electronically from a postage machine, etc.

Database 406 is configured to receive and store label information provided by label generation module 402. In some embodiments, database 406 may also receive and store label information from a packing station or postage information from a postage station or postage module 404. Label information for an article is associated with the postage information for the same article based on a common tracking number. Storing label information and postage information in database 406 allows for efficient retrieval and analysis of information concerning various mailed items and postage expenditures. For example, a user may mail multiple articles in carrying out business for a particular client account. Database 406 allows the user to retrieve and analyze label and postage information associated with the account without having to gather and review all the mailing labels and postage information for each article of mail separately.

Database 406 can also provide information to a report generation module (e.g., report generation module 408) for use in generating reports concerning the stored label information and the associated postage information. Report generation module 250 provides one or more reports including postage information associated with each mailed article. Based on the label information and associated postage information stored in database 406, report generation module 250 can provide comprehensive, detailed reports concerning each mailed article. In some embodiments, reports may further be based on report specifications provided by a user, system administrator, etc. Reports generated by report generation module 408 may also be used as input for various accounting processes, including cost allocation, cost recovery, billing, etc.

Figure 5:
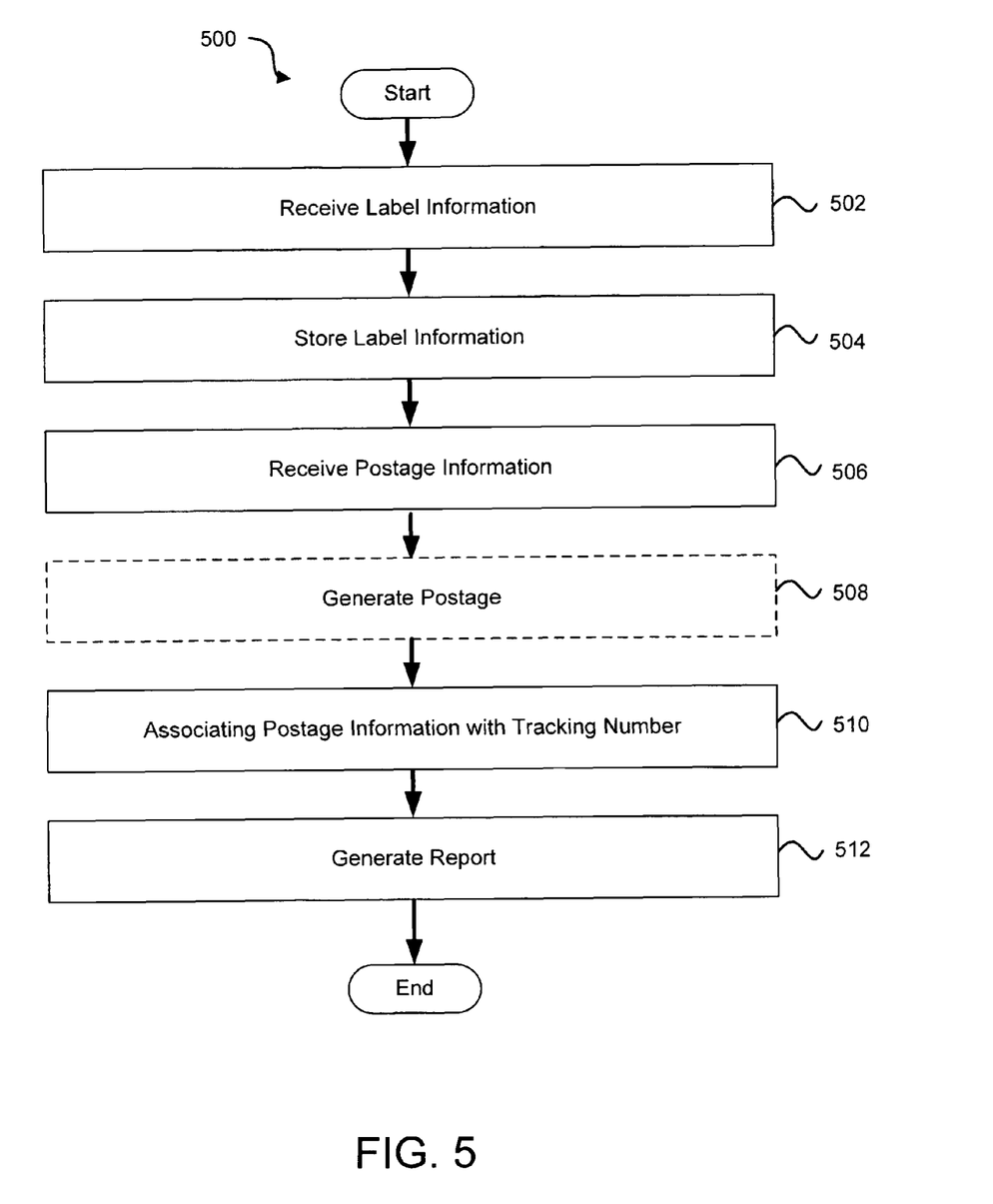
FIG. 5 is a flowchart illustrating an exemplary method for documenting mail work flows.

FIG. 5 is a flowchart illustrating an exemplary method for documenting mail work flows. In this method, label information concerning an article is received, stored, postage information concerning the same article is received and associated with the tracking number, and a report is generated based on the label information and associated postage information. In some embodiments, label information and postage information are associated based on a common tracking number.

In step 502, label information is received. The label information includes detailed information concerning an article to be mailed, such as that found in a mailing label. Such information can include sender name and address, recipient name and address, tracking number, etc. To generate a mailing label, the user must designate certain mailing information. For example, the user may enter the recipient name and address, or the user may designate a contact and contact address in a contacts manager. In some embodiments, the user may also designate a custom tracking number. Alternatively, a tracking number may be automatically assigned to the mailing label.

In step 504, label information, such as that received from label generation, is transmitted to and stored in a database (e.g., database 406). Some embodiments allow for label information (e.g., tracking numbers, including bar codes) scanned by a scanner to be stored in the database.

In step 506, postage information from a postage machine is received. The postage information includes a rate for mailing the article via the United States Postal Service. Such rates may be based on recipient address and various characteristics of the article to be mailed, including size, shape, weight, contents, value, etc. The postage machine calculates the postage rate and generates a postage stamp for mailing the article. In some embodiments of the present invention, the postage machine can receive a tracking number (e.g., designated by user, through a scanner).

In an optional step 508, a postage stamp is generated. In some embodiments, the postage stamp may be generated by a postage machine. Alternatively, the postage stamp may be generated by other types of postage provider, such as an Internet-based postage provider.

In step 510, the postage information is associated with the tracking number. In some embodiments of the present invention, the postage machine can associate the tracking number with the postage information. Alternatively, the postage information may be associated with the tracking number when they are both received by postage module 404, which may then transmit the postage information and the associated tracking number to database 406. The postage information may also be exported to another database (e.g., integrated database described in U.S. patent application titled "Integrated Database for Tracking Shipping Information," filed concurrently).

In step 512, a report is generated displaying at least some of the stored label information and the associated postage information. Label information concerning a mailing label for an article of mail is associated with the postage information for the article based on a tracking number in common. Associating label information with postage information allows for detailed reports concerning one or more articles of mail and related postage expenditures.

Figure 6:
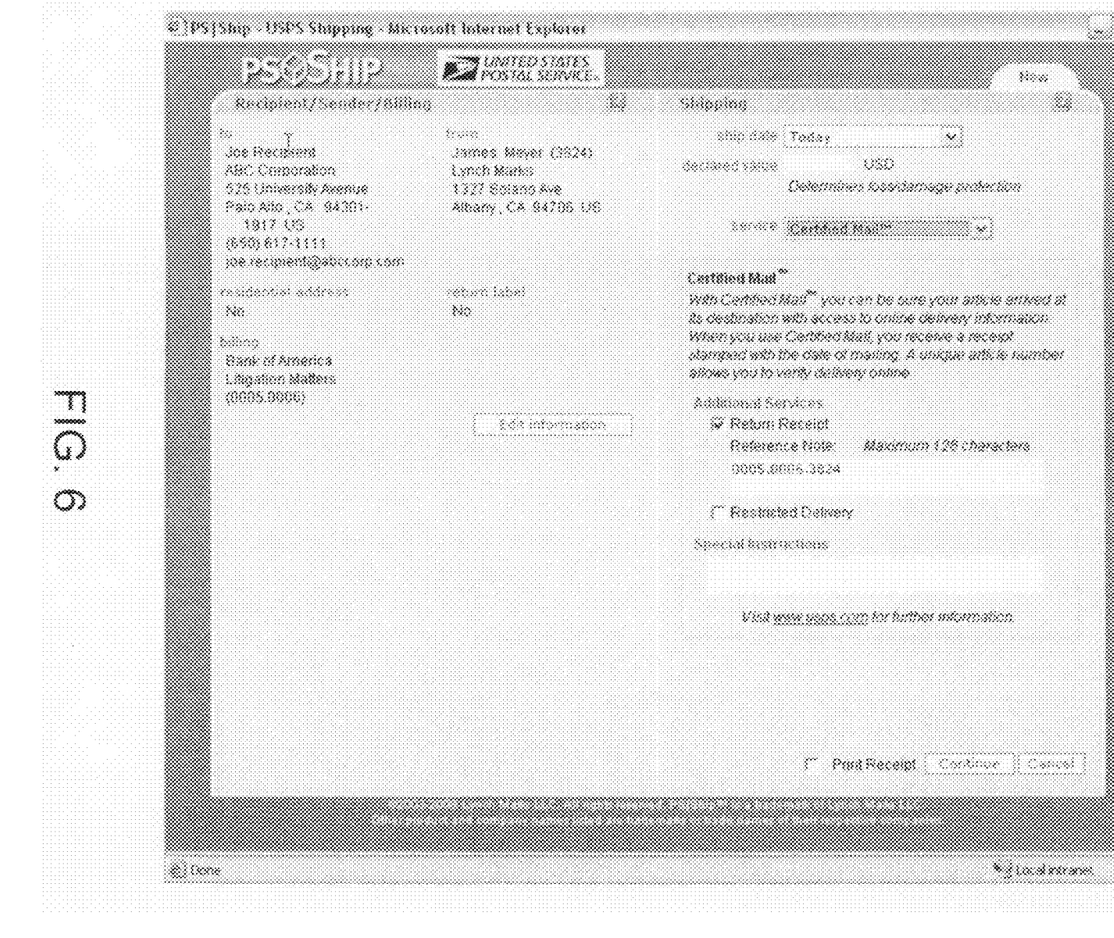
FIG. 6 is an exemplary screenshot displaying options for mailing label generation in embodiments of the present invention.

FIG. 6 is an exemplary screenshot displaying options for mailing label generation in embodiments of the present invention. As illustrated, the display allows the user to designate sender information, recipient information, billing information, mailing option information (e.g., Certified™ mail, return receipt), etc.

Figure 7:
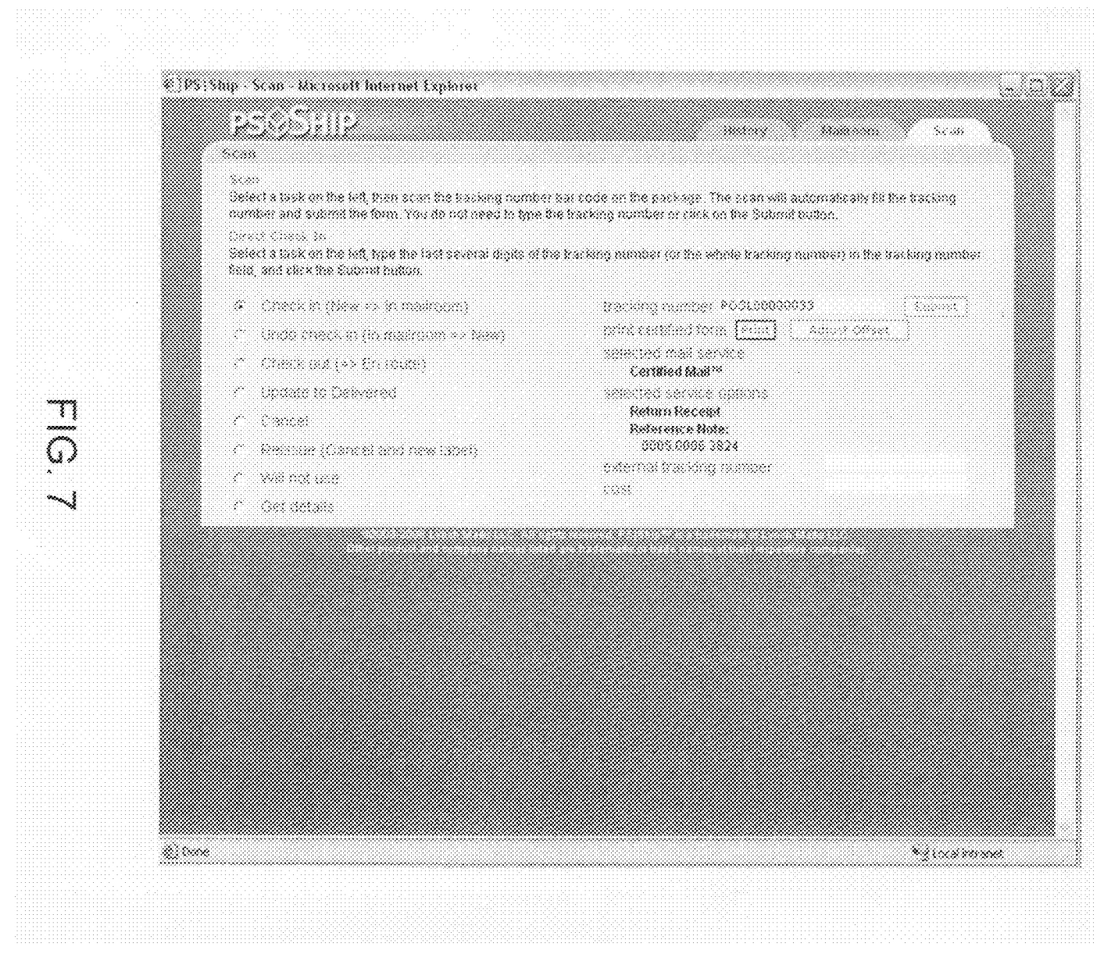
FIG. 7 is an exemplary screenshot displaying scanning options for receiving lable information in embodiments of the present invention.

FIG. 7 is an exemplary screenshot displaying scanning options for receiving lable information in embodiments of the present invention. As illustrated, the display allows the user to scan a tracking number in order to check in, check out, etc. The display further allows the user to enter an external tracking number, cost, etc., and then print the certified form for Certified™ mail.

While the present invention has been described in connection with a series of preferred embodiment, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A method for documenting mail work flows, the method comprising:
   generating a plurality of mailing labels, wherein each mailing label is a mailing label for an article and generated based on sender information and recipient information;
   storing information regarding the plurality of mailing labels in a database in memory, wherein the stored information for each mailing label includes the sender information, the recipient information, and a tracking number assigned to the mailing label;
   receiving postage information sent from a postage machine over a communication network, the postage information including a rate for mailing an article via a postal service, and a tracking number designated by a user of the postage machine; and
   executing instructions stored in memory, wherein execution of the instructions by a processor:
      matches the assigned tracking number of a mailing label included in the stored label information with a corresponding tracking number included in the postage information, and
      generates a report based on the stored label information and the associated postage information being matched as having the corresponding tracking number.

2. The method of claim 1, wherein generating one of the plurality of labels comprises receiving a user designation concerning the mailing label information.

3. The method of claim 2, wherein the label information is provided by a contacts manager designated by the user.

4. The method of claim 1, further comprising storing the postage information in the database in memory.

5. The method of claim 1, wherein the postage information received from the postage machine includes information stored at the postage machine, the stored information including:
- a plurality of rates, each rate associated with mailing one of a plurality of articles, and
- a plurality of tracking numbers, each tracking number designated for association with a corresponding rate for mailing one of the plurality of articles.

6. The method of claim 1, wherein the tracking numbers further comprises a bar codes.

7. The method of claim 1, wherein generating the report is further based on specifications designated by a user.

8. A system for documenting mails work flows, the system comprising:
- an input interface configured to receive postage information sent from a postage machine over a communication network, the postage information including a rate for mailing an article via a postal service and a tracking number designated by a user of the postage machine;
- a database stored in memory, the database being configured to store:
  - information regarding a plurality of mailing labels, wherein each mailing label is a mailing label for an article and the information regarding each mailing label includes sender information, recipient information, and a tracking number assigned to the mailing label, and
  - the postage information received from the postage machine; and
- a report generator executable by a processor to
  - match the assigned tracking number of a mailing label included in the stored label information with a corresponding tracking number included in the postage information, and
  - generate a report based on the stored label information and the postage information being matched as having the corresponding tracking number.

9. The system of claim 8, wherein the input interface is further configured to receive the information regarding the plurality of labels, each label having been generated based on one or more user designations concerning the mailing label information.

10. The system of claim 9, further comprising a label generator executable by the processor to generate the mailing labels based on the designated label information.

11. The system of claim 8, wherein the input interface is further configured to receive a scanned tracking number from the postage machine.

12. The system of claim 11, wherein the input interface is further configured to receive information stored at the postage machine, the stored information including:
- a plurality of rates, each rate associated with mailing one of a plurality of articles, and
- a plurality of tracking numbers, each tracking number designated for association with a corresponding rate for mailing one of the plurality of articles.

13. The system of claim 8, wherein the database is further configured to store the report based on the stored label information and the postage information having the corresponding tracking number.

14. The system of claim 8, wherein the tracking numbers further comprises a bar codes.

15. A non-transitory computer-readable storage medium having embodied thereon a program, the program being executable by a processor to perform a method for documenting mail work flows, the method comprising:
- generating a plurality of mailing labels, wherein each mailing label is a mailing label for an article and generated based on sender information and recipient information;
- storing information regarding the plurality of labels in a database, wherein the stored information for each mailing label includes the sender information, the recipient information, and a tracking number assigned to the mailing label;
- receiving postage information sent from a postage machine, the postage information including a rate for mailing an article via a postal service, and a tracking number designated by a user of the postage machine;
- matching the assigned tracking number of a mailing label included in the stored label information with a corresponding tracking number included in the postage information, and
- generating a report based on the stored label information and the associated postage information being matched as having the corresponding tracking number.

16. The non-transitory computer-readable medium of claim 15, wherein the information received from the postage machine includes information stored at the postage machine, the stored information including:
- a plurality of rates, each rate associated with mailing one of a plurality of articles, and
- a plurality of tracking numbers, each tracking number designated for association with a corresponding rate for mailing one of the plurality of articles.

* * * * *